United States Patent [19]

Gray, Jr.

[11] Patent Number: 5,004,003

[45] Date of Patent: Apr. 2, 1991

[54] FIRE CONTROL VALVE WITH PIVOTAL LATCH

[76] Inventor: Charles H. Gray, Jr., 905 Canton Rd., Kingsport, Tenn. 37660

[21] Appl. No.: 459,975

[22] Filed: Jan. 2, 1990

Related U.S. Application Data

[63] Continuation-in-part of Ser. No. 192,640, May 11, 1988, Pat. No. 4,890,635.

[51] Int. Cl.$^5$ .............................................. F16K 31/64
[52] U.S. Cl. .......................................... 137/75; 251/74
[58] Field of Search ...................... 251/67, 74; 137/75, 137/79

[56] References Cited

U.S. PATENT DOCUMENTS

| | | | |
|---|---|---|---|
| 1,108,772 | 8/1914 | Meacham | 251/67 X |
| 1,874,356 | 8/1932 | Rowley | 251/74 X |
| 2,638,106 | 5/1953 | Shiels | 137/75 |
| 3,140,721 | 7/1964 | Sullivan | 137/75 |
| 3,378,021 | 4/1968 | Milo | 137/75 X |

*Primary Examiner*—John C. Fox
*Attorney, Agent, or Firm*—Fleit, Jacobson, Cohn, Price, Holman & Stern

[57] ABSTRACT

A valve installed in the flow line of a flammable or other hazardous flowable material which normally open but will be automatically closed to interrupt the flow of flammable or hazardous material to a discharge point in the event of a hazardous condition occurring. The valve is held in an open position by a fusible link which retains a pivotal latch in engagement with a spring biased valve to retain the valve in open position. The fusible link will melt when subjected to predetermined conditions such as a high temperature condition which occurs in the event of a fire thereby releasing the latch and valve for movement to a closed position for stopping flow of flammable material in order to control the fire or other hazardous condition.

10 Claims, 1 Drawing Sheet

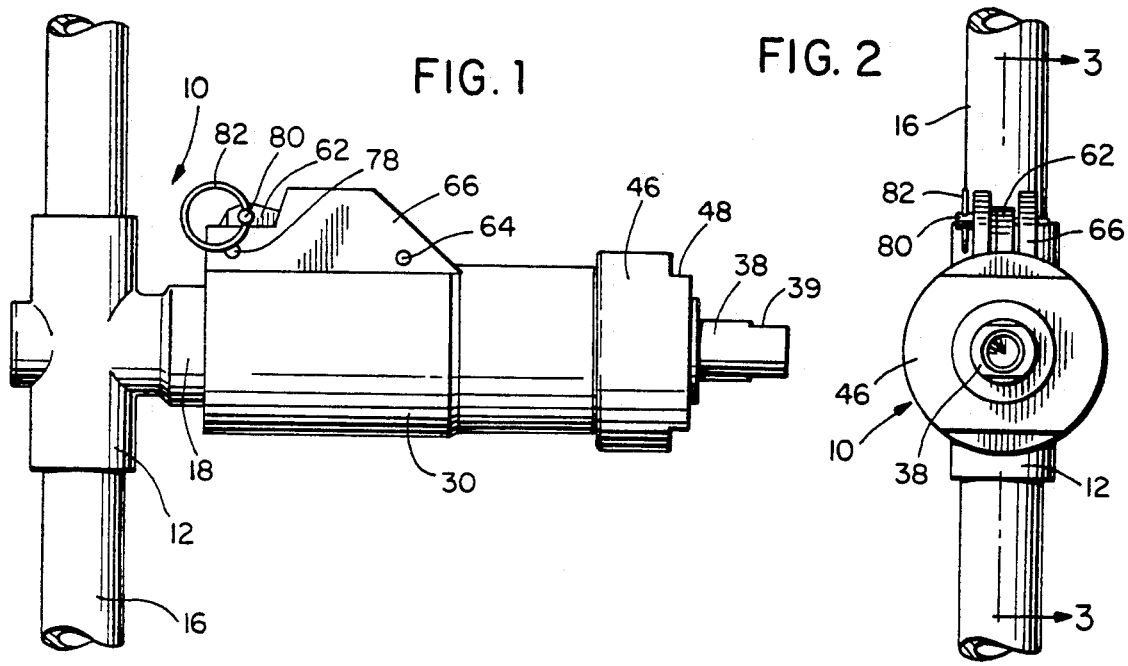
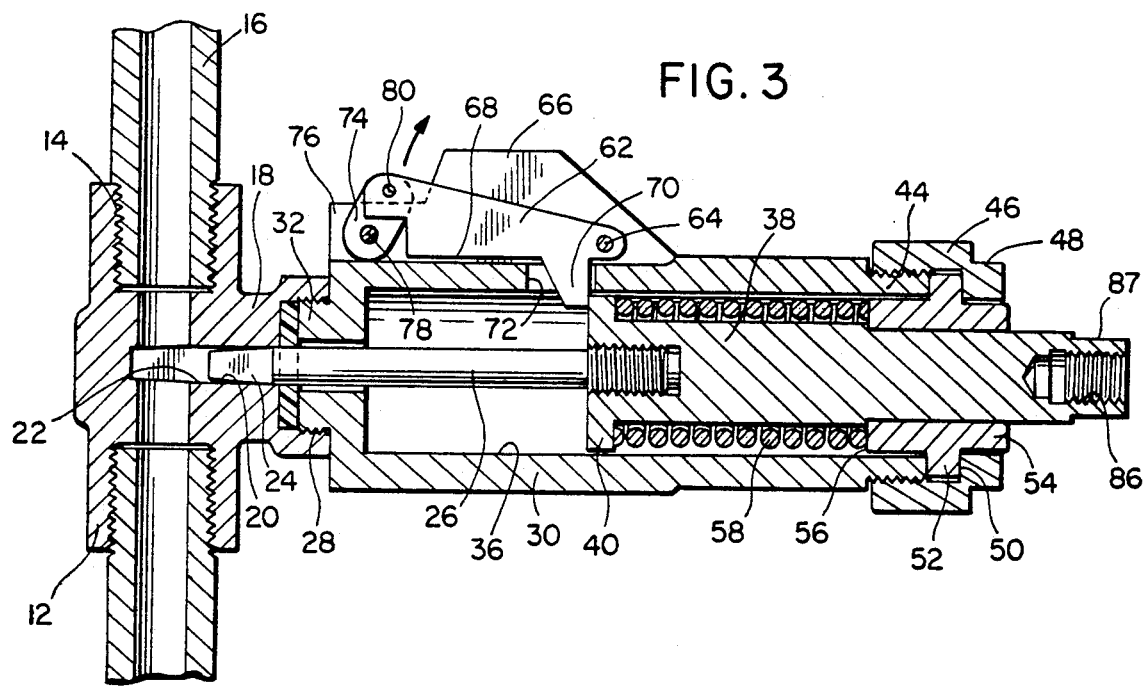
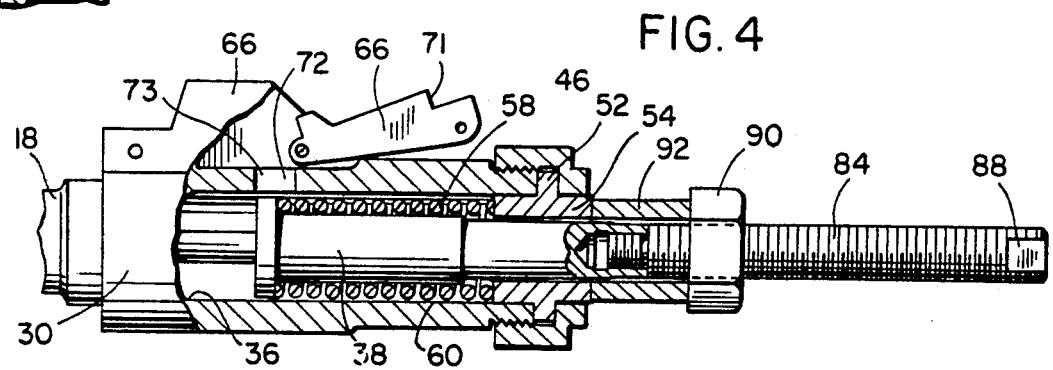

FIRE CONTROL VALVE WITH PIVOTAL LATCH

CROSS-REFERENCE TO RELATED APPLICATION

This application is a continuation-in-part of pending application Ser. No. 07/192,640 filed May 11, 1988 for Fire Control Valve now U.S. Pat. No. 4,890,635 issued Jan. 2, 1990.

BACKGROUND OF THE INVENTION

1. Field of the Invention

The present invention generally relates to a fire control valve and more particularly a valve installed in the flow line of a flammable or other hazardous flowable material which is normally open but will be automatically closed to interrupt the flow of flammable or hazardous material to a discharge point in the event of a hazardous condition occurring. The valve is held in an open position by a fusible link which retains a pivotal latch in engagement with a spring biased valve to retain the valve in open position. The fusible link will melt when subjected to predetermined conditions such as a high temperature condition which occurs in the event of a fire thereby releasing the latch and valve for movement to a closed position for stopping flow of flammable material in order to control the fire or other hazardous condition.

2. Information Disclosure Statement

Automatically operated valves are well known in various flow lines with such valves being moved from one position to another in response to various ambient conditions. Included in such valves are valves which are located in water supply lines associated with sprinklers or the like so the valves will be automatically opened to discharge water from a plurality of sprinkler heads in the event the ambient temperature becomes elevated above a certain unsafe level. The prior art cited in the aforementioned parent application and made of record herein does not include a structure equivalent to the structure of this invention.

SUMMARY OF THE INVENTION

An object of the present invention is to provide a fire control valve that can be quickly and easily installed in a supply line or flow line for flammable material with the valve being retained in open position by a fusible or meltable link which releasably maintains a pivotal latch in engagement with a spring biased valve to retain the spring biased valve in open position until the fusible link is ruptured due to elevated heat conditions such as may occur during a fire with rupture of the fusible link enabling the spring biased valve to move to a closed position to interrupt or stop the flow of flammable material to the site of a fire.

Another object of the invention is to provide a fire control valve in accordance with the preceding object in which the pivotal latch does not rely upon an external spring for movement to a position to release the valve with the force created by the spring biased valve camming the latch to a released position when the fusible link is ruptured.

A further object of the invention is to provide a fire control valve in accordance with the preceding objects in which the pivotal latch is engaged with the face of a piston on the stem of the valve with the major portion of the latch disposed outwardly of a housing and in the form of a pivot arm pivotally supported from the housing at one end and connected to the housing at the other end by a meltable or fusible link.

Still another object of the invention is to provide a fire control valve in accordance with the preceding objects which is easy to install, dependable in use, easy to reset after being triggered, effective for controlling the flow of flammable material such as gasoline to the site of a fire and provided with a quick release pin connecting the fusible link to the housing to enable quick manual release of the valve when desired.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of the fire control valve of the present invention illustrating the valve installed in a flow line.

FIG. 2 is an end elevational view illustrating specific structural details of the valve housing and pivotal latch.

FIG. 3 is a longitudinal, sectional view of the valve of the present invention taken substantially along section line 3—3 on FIG. 2 illustrating the structure of the components when in open position.

FIG. 4 is a sectional view similar to FIG. 3 but illustrating the valve in closed position.

DESCRIPTION OF THE PREFERRED EMBODIMENT

The fire control valve of the present invention is generally designated by reference numeral 10 and includes a bore 12 having oppositely disposed screw threaded openings 14 to receive the threaded ends of a flow pipe or supply pipe 16 used to convey gasoline or other flammable gases, liquids or other material from a point of supply to a point of use or discharge. While a screw threaded connection has been illustrated, it is pointed out that various types of connecting arrangements may be provided for effectively connecting the valve body 12 to the pipes or conduits 16.

The valve body 12 includes a lateral extension 18 having a hollow interior bore 20 that communicates with a valve seat 22 of a conventional gate valve in the body 12 to that fluid can flow through the valve body 12 from one pipe 16 to the other.

Reciprocally mounted in the valve body 12 is a gate valve member 24 provided with a valve stem 26 extending axially from the valve member 24. The valve member 24 corresponds with the configuration of the valve seat 22 so that when the valve member 24 is completely received in the valve seat 22, the flow path from one pipe 16 to the other pipe 16 is closed as illustrated in FIG. 4. However, as long as the valve member 24 is retracted, the flow path remains open. The shape and configuration of the valve seat and valve member may vary but preferably is a gate valve or any other conventional valve in which the stem 26 is sealed in relation to the lateral extension 18 in a conventional manner.

The outer end of the lateral extension 18 is internally threaded at 28 and threadably supports a generally cylindrical actuator housing 30 which has a reduced diameter, externally threaded end 32 that is screw threadedly engaged with the internally threaded end 28 on the lateral extension 18 with the valve stem 26 reciprocally received in the housing 30. The housing 30 is adapted to be connected to various types of valves having a reciprocating valve stem. As illustrated, the interior of the housing 30 forms a cylinder 36 which slidably receives and closely receives an actuator piston 38 which has a flange 40 at the end thereof facing the valve body 12 with the stem 26 being screw threaded into the end of the piston 38 as indicated at 42. The outer end of the housing 30 is provided with an externally threaded portion 44 that threadedly receives an internally threaded cap nut 46 having a pair of diametrically opposed end recesses 48 which are adapted to receive wrench jaws for tightening and loosening the nut 46. The interior of the nut 46 is provided with a shoulder 50 which engages an external flange 52 on a cylindrical spring retainer 54 which has an inner end 56 engaging one end of a coil compression spring 58 which has its other end engaging the inner surface of the flange 40 on the piston 38 thus spring biasing the piston 38 and thus the valve stem 26 and valve member 24 toward a closed position which is illustrated in FIG. 4. The piston 38 includes a peripheral shoulder 60 which limits the outward movement of the piston 38 when the spring 58 is compressed and the valve member 24 is in open position.

A pivotal latch 62 in the form of a pivot arm is mounted exteriorly of the housing 30 and longitudinally thereof adjacent the end which is attached to the valve body 12. The pivot arm 62 tapers to a narrow end portion provided with a pivot pin 64 which pivotally mounts the end of the arm 62 remote from the valve body 12 between a pair of mounting lugs 66 rigidly affixed to the exterior surface of the housing 30 thereby enabling the pivotal latch 62 to pivot from a position with its inner edge 68 alongside and adjacent the exterior surface of the housing when in latched position as illustrated in FIG. 3 to a released position as illustrated in FIG. 4. The inner edge 68 of the pivotal latch 62 includes a projecting lug or latching member 70 which extends through an opening 72 in the housing 30 with the lug 70 including a straight, radial surface 71 which engages the end of the piston 38 by extending inwardly from the outer periphery of the flange 40 a sufficient distance to retain the piston 38 in retracted position and retain the coil spring 58 in compressed condition and retain the valve member 24 in open position when the pivotal latch 62 is secured with its inner edge along the outer surface of the housing 30 as illustrated in FIG. 3.

A fusible link 74 interconnects the end of the pivotal latch 62 remote from the latching member or lug 70 to end portions 76 of the mounting legs or flanges 66 by a pin 78. The other end of the fusible link 74 is connected to the pivotal latch 62 by a removable latch pin 80 having a finger loop or ring 82 mounted on one end thereof to enable the pin 80 to be quickly removed when it is desired to manually close the valve without rupture of the fusible link.

With the valve locked in open position as illustrated in FIG. 3, high temperature conditions will cause the fusible link to melt or rupture thus releasing the end of the pivotal latch 62 which will be cammed or forced outwardly due to the axial force exerted on the piston 38 by the compressed spring 58. This force will pivot the latch 62 outwardly about pivot pin 64 thus retracting the locking member or lug 70 from blocking engagement with the flange 40 on the piston 38 thereby permitting the spring to quickly and rapidly close the valve.

After the valve has been closed, in order to reset it, a tool in the form of a threaded rod 84 is screw threaded into the internally threaded end portion 86 of the piston 38 which extends to the outer end of the retainer 54. The end of the threaded rod 84 includes flat portions 88 and the outer end of the piston 38 includes flat portions 87 to receive a wrench or the like and a thrust nut 90 is threaded on the threaded member 84 together with a cylindrical thrust sleeve 92 which extends between the nut 90 and the spring retainer 54 as illustrated in FIG. 4 thus enabling rotation of the nut 90 to retract the piston 38 and compress the spring 58 until the flange 40 is retracted to a position to enable the pivotal latch 66 to be swung back to the position illustrated in FIG. 3. A new fusible link replaces the ruptured fusible link by removing the pins 78 and 80 and using these pins to connect the new fusible link to the end portion 74 of the flanges or lugs 66 and the end of the pivotal latch 62. As illustrated in FIG. 3, the end of the piston 38 which extends beyond the spring retainer 54 and the nut 46 serves as a visible indicator that the actuator piston is retracted and that the fire control valve is in operative condition and capable of being closed either by rupture of the fusible link or removal of the pin 80.

The cap nut 46 retains the assembly together, retains the thrust of the spring 58 and retains the retainer 54 on the housing 30. The threaded connection 42 between the actuator piston and the valve stem enables the device to be used with various types of valves with the valve stem of the valve being connected to the piston 38.

The fusible link 74 is constructed of heat sensitive alloys that respond to a desired temperature and may be constructed to respond to different temperature ranges with a beginning melting point being relatively low such as 135° F. with the fusible links then being available in increasing temperature increments. The pull pin enables the valve to be quickly closed in case of an emergency not related to temperature rise with release of the piston when the latch 62 swings to the released position enabling a snap or rapid close of the valve. The external surface of the housing 30 may be painted red or other significant color with the red paint indicating that it is a fire control device.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A fire control valve comprising a valve body having a flow passage therethrough and adapted to be connected to a flow line through which flammable material flows, said valve body including a valve seat, a valve member selectively engageable with the seat and forming a closure for the flow path when engaged with the seat, spring means biasing the valve member into engagement with the valve seat, means releasably retaining the valve member in a position to enable flow through the flow path, and temperature responsive means disabling the means retaining the valve member in flow enabling position to automatically release the valve member to move to a flow interrupting position in the event temperature conditions exceed a predetermined temperature, said spring means comprising a housing connected to the valve body, an actuator piston in said housing, means connecting the actuator piston to said valve member, a coil compression spring reacting against the piston and housing for moving the piston and valve member to engage the valve member with the valve seat, said means releasably retaining the valve member in a position to enable flow through the flow path including a pivotal latch mounted on the housing and engageable with the actuator piston to retain the actuator piston in a retracted position with the coil spring compressed, said temperature responsive means including a fusible link connecting a portion of the pivotal latch to the housing to retain the pivotal latch in engagement with the actuator piston with the fusible link being rupturable in response to predetermined high temperature conditions to enable the spring biased actuator piston to cam the latch to a released position thereby enabling the valve member to close.

2. The structure as defined in claim 1 wherein one end of said fusible link is anchored by a removable pin having a handle means at one end thereof to enable quick removal of the pin and release of the fusible link to release the pivotal latch thereby enabling quick closing of the valve member.

3. The structure as defined in claim 1 wherein said actuator piston includes a peripheral flange slidably received in said housing, said housing including a lateral opening, said pivotal latch including a projecting lug extending through the opening into engagement with the face of the peripheral flange when the pivotal latch is retained in locked position by the fusible link.

4. The structure as defined in claim 3 wherein the end of the housing remote from the valve body includes a screw threaded nut and spring retainer to retain the coil spring against the flange on the actuator piston with the actuator piston extending through the spring retainer to a point externally of the housing to enable visual observation thereof for indicating that the valve member is in open position.

5. The structure as defined in claim 4 wherein the end of the actuator piston remote from the valve member is provided with a threaded end portion, a tool for retracting the actuator piston and compressing the spring threadedly attached to the actuator piston and reacting against the housing to move the actuator piston and valve member to an open position to enable the pivotal latch to be pivoted to a locked position and retained in the locked position by a new fusible link.

6. A fire control valve comprising a valve body having a flow passage therethrough and adapted to be connected to a flow line through which flammable material flows, said valve body including a valve seat, a valve member selectively engageable with the seat and forming a closure for the flow path when engaged with the seat, spring means biasing the valve member into engagement with the valve seat, means releasably retaining the valve member in a position to enable flow through the flow path, and temperature responsive means disabling the means retaining the valve member in flow enabling position to automatically release the valve member to move to a flow interrupting position in the event temperature conditions exceed a predetermined temperature, said spring means comprising a housing connected to the valve body, an actuator piston in said housing, means connecting the actuator piston to said valve member, a coil compression spring reacting against the piston and housing for moving the piston and valve member to engage the valve member with the valve seat, said means releasably retaining the valve member in a position to enable flow through the flow path including a pivotal latch mounted on the housing and engageable with the actuator piston to retain the actuator piston in a retracted position with the coil spring compressed, said temperature responsive means including a fusible link connecting a portion of the pivotal latch to the housing to retain the pivotal latch in engagement with the actuator piston with the fusible link being rupturable in response to predetermined high temperature conditions to enable the spring biased actuator piston to pivot the latch to a released position thereby enabling the valve member to close, one end of said fusible link being anchored by a removable pin having a handle means at one end thereof to enable quick removal of the pin and release of the fusible link to release the pivotal latch thereby enabling quick closing of the valve member, said actuator piston including a peripheral flange slidably received in said housing, said housing including a lateral opening, said pivotal latch including a projecting lug extending through the opening into engagement with the face of the peripheral flange when the pivotal latch is retained in locked position by the fusible link, the end of the housing remote from the valve body including a screw threaded nut and spring retainer to retain the coil spring against the flange on the actuator piston with the actuator piston extending through the spring retainer to a point externally of the housing to enable visual observation thereof for indicating that the valve member is in open position, the end of the actuator piston remote from the valve member being provided with a threaded end portion, a tool for retracting the actuator piston and compressing the spring threadedly attached to the actuator piston and reacting against the housing to move the actuator piston and valve member to an open position to enable the pivotal latch to be pivoted to a locked position and retained in the locked position by a new fusible link, said tool including an elongated externally threaded member having a thrust nut thereon for reacting against the housing to move the actuator to its retracted position.

7. The fire control valve as defined in claim 1 wherein said pivotal latch is mounted on the exterior of said housing.

8. The fire control valve as defined in claim 7 wherein a transverse pivot pin connects the latch to the housing adjacent the point of engagement between the latch and actuator piston when the piston is in retracted position.

9. The fire control valve as defined in claim 8 wherein said pivotal latch extends longitudinally of the housing along the exterior thereof, said fusible link being mounted on the exterior of said housing and connected to said latch in remote relation to the transverse pin to enable the pivotal latch to be cammed to an out-of-the-way position as the piston moves from retracted position.

10. A fire control valve comprising a valve body having a flow passage threthrough and adapted to be connected to a flow line through which flammable material flows, said valve body including a valve seat, a valve member selectively engageable with the seat and forming a closure for the flow path when engaged with the seat, spring means biasing the valve member into engagement with the valve seat, means releasably retaining the valve member in a position to enable flow through the flow path, and temperature responsive means disabling the means retaining the valve member in flow enabling position to automatically release the valve member to move to a flow interrupting position in the event temperature conditions exceed a predetermined temperature, said spring means comprising a housing connected to the valve body, an actuator piston in said housing, means connecting the actuator piston to said valve member, a coil compression spring reacting against the piston and housing for moving the piston and valve member to engage the valve member with the valve seat, said means releasably retaining the valve member in a position to enable flow through the flow path including a pivotal latch mounted on the housing and engageable with the actuator piston to retain the actuator piston in a retracted position with the coil spring compressed, said temperature responsive means including a fusible link connecting a portion of the pivotal latch to the housing to retain the pivotal latch in engagement with the actuator piston with the fusible link being rupturable in response to predetermined high temperature conditions to enable the spring biased actuator piston to cam the latch to a released position thereby enabling the valve member to close, the end of the actuator piston remote from the valve member being provided with a threaded end portion, a tool for retracting the actuator piston and compressing the spring threadedly attached to the actuator piston and reacting against the housing to move the actuator piston and valve member to an open position to enable the pivotal latch to be pivoted to a locked position and retained in the locked position by a new fusible link, said tool including an elongated externally threaded member having a thrust nut thereon for reacting against the housing to move the actuator piston to its retracted position.

* * * * *